United States Patent [19]
Desmarais

[11] Patent Number: 5,168,894
[45] Date of Patent: Dec. 8, 1992

[54] AIR TERMINAL

[76] Inventor: Brett A. Desmarais, 8589 Nazareth Dr., Clay, N.Y. 13041

[21] Appl. No.: 676,503

[22] Filed: Mar. 28, 1991

[51] Int. Cl.⁵ .............................................. F16K 31/36
[52] U.S. Cl. ..................................... 137/486; 236/49.3
[58] Field of Search ............................ 236/49.3, 49.4; 137/486

[56] References Cited

U.S. PATENT DOCUMENTS

| | | | |
|---|---|---|---|
| 4,120,453 | 10/1978 | Herb et al. | 236/49.4 |
| 4,331,291 | 5/1982 | Dean | 236/49.4 |
| 4,648,552 | 3/1987 | Carlson et al. | 236/49.4 |
| 4,756,474 | 7/1988 | Tulowiecki et al. | 236/49.4 |

Primary Examiner—William E. Tapolcai

[57] ABSTRACT

A method and apparatus for controlling and measuring the amount of conditioned air flowing through an air terminal to a conditioned space for adjusting the space temperature to a desired temperature.

3 Claims, 1 Drawing Sheet

AIR TERMINAL

BACKGROUND OF THE INVENTION

This invention relates generally to air terminals for delivering conditioned air to an area or space and more particularly to a means for measuring the actual air flow through the air terminal with respect to a desired air flow, over a period of time.

The utilization of air distribution damper units to supply conditioned air from a central source thereof to offices, school rooms, and other similar spaces or areas in multi-room buildings have become increasingly prevalent. Such air distribution units are typically located in the ceiling of the rooms or areas being conditioned, or on the floor thereof adjacent the windows. The flow of conditioned air from the units is generally regulated by operation of suitable damper means controlled by a thermostat sensing the temperature of the space being conditioned. Thus as the temperature of the space deviates to a greater degree from a predetermined set point, a greater quantity of conditioned air is discharged into the space. Conversely, when the temperature in the space being conditioned approaches the set point, the quantity of conditioned air discharged into the space is reduced. Thus, the system varies the air volume to the space depending upon the deviation of the space temperature from the set point and the thermal load in the space. In U.S. Pat. No. 4,756,474 assigned to the same assignee as the present invention there is described a pneumatic controller for a duct pressure power air terminal unit having a volume controller which receives two pressure signals, whereby the controller bleeds one pressure signal so as to control the inflation of a bellows to thereby modulate the terminal unit to maintain a constant volume air flow through the unit. The controller bleeds the second pressure signal so as to maintain at least a minimum flow through the unit. Although the controller is a complicated pneumatic device requiring a rather elaborate internal mechanism and piping arrangement, it is an improvement over U.S. Pat. No. 4,120,453 which describes a three-way valve controller having two pressure regulators and a bleed type thermostat which provide four input signals to the pneumatic three-way-valve thereby providing a single pressure signal to the inflatable bellows.

The pneumatic air terminals in the above mentioned patents are powered by duct static pressure and require a continuous fill and bleed of the bladder to maintain a desired space temperature. However, there is no means to measure the total flow through the terminals. Thus, there is a clear need for an air distributing unit controller having means to ensure efficient operation of the unit while delivering the correct amount of desired air flow per period of time, and thus allowing accurate measurement of the total air flow into a space e.g. for tenant billing.

SUMMARY OF THE INVENTION

Accordingly, it is an object of the present invention to provide a damper control means for an air terminal which measures the total air to a space over a period of time while maintaining the desired amount of conditioned air to the space.

It is a further object of the present invention to provide a damper control means for an air terminal having an inexpensive mass air flow means for measuring the amount of conditioned air flowing through an air terminal to a space per unit time.

It is another object of the present invention to provide an air terminal means having a damper mechanism which provides a desired conditioned air flow and a cumulative flow to a space without the use of expansive pressure or velocity sensors.

These and other objects of the present invention are obtained by means of an air terminal having a baffle means therein for creating a pressure drop across the baffle whereby the pressure difference across the baffle is measured as a small air flow indicative of the flow of conditioned air through the terminal. A signal representing this small air flow through the mass air flow sensor is observed in a unit time in a terminal control unit for determining the total flow to the space per the desired unit time. The mass air flow measurement is used to control the movement of a damper mechanism in the air terminal and as a measure of the flow into the space.

BRIEF DESCRIPTION OF THE DRAWINGS

Other objects and advantages of the present invention will be apparent from the following detailed description in conjunction with the accompanying drawing forming a part of the specification and in which.

DESCRIPTION OF THE PREFERRED EMBODIMENTS

Figure 1:
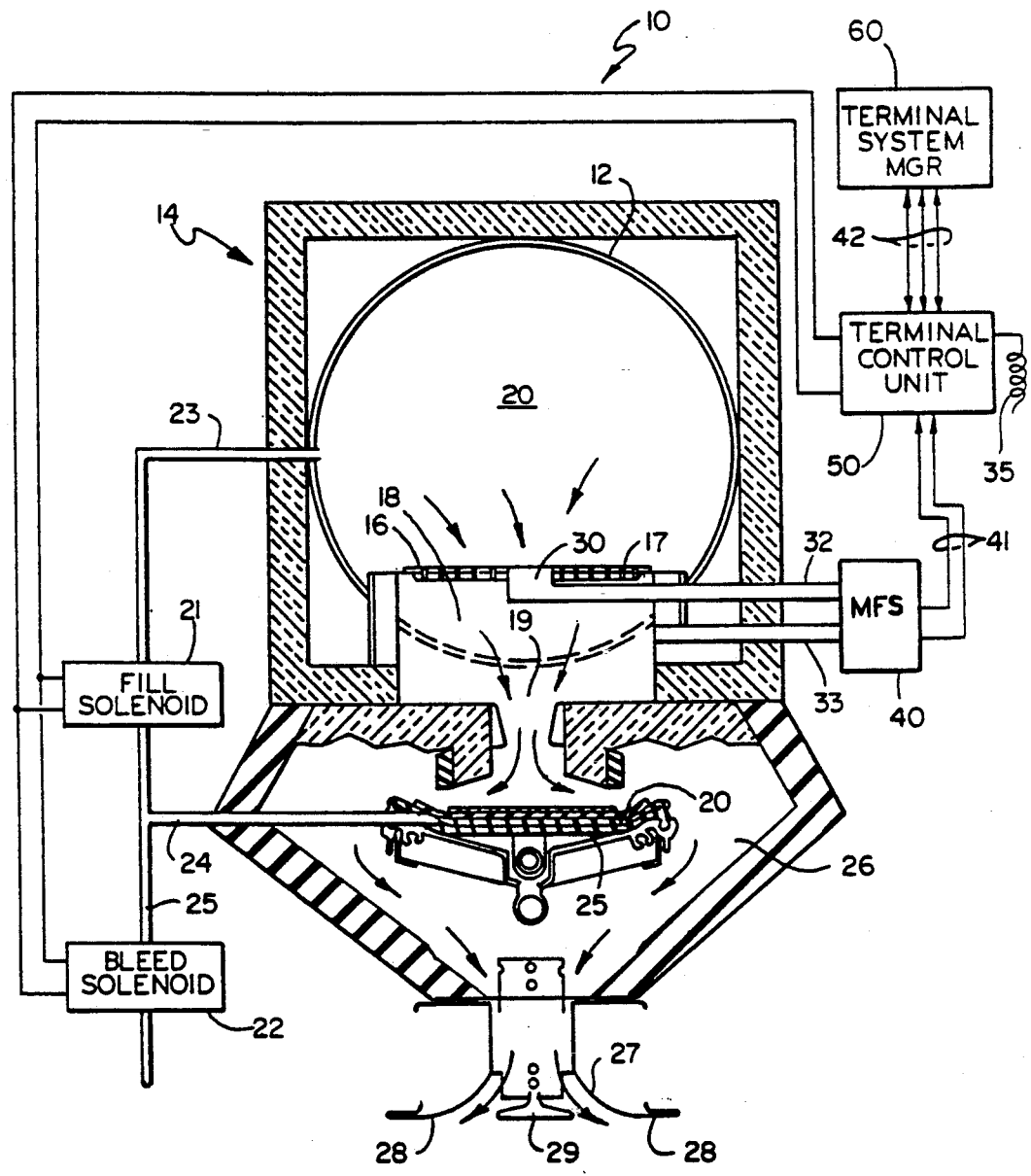
FIGURE 1 is a diagrammatic representation of an air terminal incorporating the present invention.

In FIGURE 1, numeral 10 generally designates a ceiling air conditioning unit or air terminal including a primary chamber 12 generally lined with a sound absorbing material 14 such as a glass fiber blanket. The primary chamber 12 forms an air plenum 20 and is ordinarily open at both ends to permit the connecting of a series of terminals end to end by way of a duct to provide a complete air discharge system. The terminals are connected to an air supply duct and air source which is provided to supply conditioned air to the terminals located in a space or rooms in an enclosure. The conditioned air is treated in a central air conditioning apparatus, as is known. An air supply distribution plate 16, having a plurality of openings 17 therein, is provided to evenly distribute the primary high pressure air supplied from plenum 20 into low pressure distribution chamber 18 which is defined by the top and side walls of distribution plate 16. The low pressure distribution chamber 18 has an outlet 19 therethrough and located downstream in the air flow thereof which permits air to flow through air distribution chamber 26, and outlet members 27 having outwardly flared lower portions 28. Diffuser member 29 is located generally midway between flared lower portions 28.

A high pressure pickup 30 extends through distribution plate 16 from high pressure chamber 12 and is connected by way of line 32 to the high pressure inlet port of mass flow sensor 40. Low pressure pickup 31 is located within low pressure distribution chamber 18 and is connected by way of line 33 to the low pressure inlet port of the mass flow sensor 40. Mass low sensor 40 compares the flowing high pressure air and the flowing low pressure air therethrough and provides an output signal, representing the amount of conditioned air flowing through the distribution plate 16 and discharged to a space, by way of lines 41 to the terminal control unit 50. Terminal control unit 50 includes either integral room temperature sensor 35 or a remote temperature sensor (not illustrated). Terminal control unit 50 also receives space temperature set point signals, occupancy signals, set back signals, etc. by way of lines 42 from terminal system manager (TSM) 60. Terminal control unit 50 provides an output signal to control the position of a damper which controls the amount of conditioned air to the space. The damper includes a bellows 20 which regulates the air flow discharged from the terminal. The filling or bleeding of the bellows is controlled by solenoid 21 which controls the filling or inflation of the chamber 25 defined between the sides of continuous bellows 20, and solenoid valve 22 which controls the bleeding or exhausting of the chamber 25 of bellows 20. High pressure air is supplied from plenum 20 to fill solenoid 21 by way of air line 23 and 24. Bleed solenoid 22 is connected to bellows 20 by way of air line 24 and 25 through bleed solenoid 22 to atmosphere.

During operation of the air terminal 10, the fill solenoid 21 and bleed solenoid 22 are normally closed. Thus bellows 20 is positioned with respect to plenum outlet 19 for controlling the flow of air to the space. In the cooling mode, for example, as the temperature of the space being conditioned deviates from the desired set point the terminal control unit 50 provides an output signal to bleed solenoid 22 to deflate bellows 20, thus increasing the flow of conditioned air through outlet 19 to the space. As the temperature of the space being conditioned approaches set point, terminal control unit 50 provides an output signal to fill solenoid 21 to open the solenoid, thus high pressure duct air will be furnished through conduit 23, fill solenoid 21, and conduit 24 to inflate bellows 20, thereby reducing the flow of conditioned air through outlet 19. Moreover, when neither fill solenoid valve 21 nor bleed solenoid valve 22 are energized the bellows will remain at some inflated state allowing the exact desired air flow through the terminal unit 10. This control allows the solenoid valves to be generally deenergized once the system has reached a desired air flow. Further, during inflation/deflation of the bellows 20, and when the fill and bleed solenoids are de-energized, if there is flow through air distribution chamber 26, the mass flow sensor 40 will sense such flow and, as set forth above, provides an output signal characteristic of the mass flow through the air terminal. The terminal control unit 50 calculates the air flow per unit time through the mass flow sensor 40, representing the flow through the terminal unit, and sums the total flow for use, e.g. to be read at the terminal system manager, as the total amount of conditioned air discharged to a space.

While a preferred embodiment of the present invention has been depicted and described, it will be appreciated by those skilled in the art that many modifications, substitutions and changes may be made thereto without departing from the true spirit and scope of the invention. For example, although the invention has been described in terms of a horizontal bellows which fills and bleeds in the vertical direction, the bellow may also be positioned in the vertical direction with its bleed and fill movement in the horizontal direction.

What is claimed is:

1. An air terminal control apparatus for controlling the supply of conditioned air through an air terminal to a space and for calculating the total air air flow through the air terminal to the space comprising:

an air plenum means for supplying high pressure conditioned air to a first inlet;

a distribution plate means in said first inlet having a plurality of apertures therethrough for reducing the pressure of the supply of conditioned air flowing therethrough from said air plenum means to a first outlet;

a mass flow sensing means for sensing the amount of conditioned air flowing through said distribution plate means, said mass flow sensing means having a first conduit means having a high pressure inlet portion located in said distribution plate for flowing high pressure air therethrough and a second conduit means having a lower pressure inlet portion located in said first outlet for flowing low pressure air therethrough, said mass flow sensing means providing an output signal representative of the amount of conditioned air flowing through the first outlet, a terminal control means for receiving the output signal from said mass flow sensing means and comparing the output signal to a difference signal between the actual space temperature and a desired space temperature and generating a damper control signal;

a damper means located downstream of said first outlet for receiving said damper control signal and for adjusting the flow of conditioned air through said fist outlet to the space to be conditioned in required amounts; and a calculation means for summing the output signal per a predetermined time period for calculating the total flow of conditioned air through said first outlet.

2. The air terminal apparatus of claim 1 wherein said damper means is a bellows.

3. A method of calculating the flow of conditioned air through an air terminal into a space to be conditioned, comprising the steps of:

supplying high pressure conditioned air to a distribution means in the air terminal;

distributing the high pressure conditioned air through said distribution means for reducing the pressure of the high pressure conditioned air to low pressure air;

generating an output signal from a mass flow sensor by comparing high pressure air flowing through the mass flow sensor to low pressure air flowing through the mass flow sensor, said output signal being proportional to the amount of conditioned air flowing through said distribution means;

adjusting a damper means for adjusting the amount of conditioned air flowing through said distribution means by comparing the generated output signal of the mass flow sensor to a difference signal between the sensor to a difference signal between the actual temperature of the space to be conditioned and the desired temperature of the space to be conditioned;

calculating the total conditioned air flowing through said distribution means by summing the generated output signal from the mass flow sensor over a predetermined period of time wherein the calculation is a measure of the total air flow into the space.

* * * * *